(12) United States Patent (10) Patent No.: US 7,669,824 B2
Woehrle et al. (45) Date of Patent: Mar. 2, 2010

(54) DRIVE FOR ADJUSTING MOTOR VEHICLE SEATS

(75) Inventors: Michael Woehrle, Niedereschach (DE); Hans Dropmann, Köln (DE); Andreas Gapp, Donaueschingen (DE); Urban Knoepfle, Titisee-Neustadt (DE); Stefan Wetzig, Ennepetal (DE)

(73) Assignees: IMS Gear GmbH, Donaueschingen (DE); Keiper GmbH & Co. KG, Kaiserslautern (DE)

( * ) Notice: Subject to any disclaimer, the term of this patent is extended or adjusted under 35 U.S.C. 154(b) by 4 days.

(21) Appl. No.: 10/585,454

(22) PCT Filed: Dec. 17, 2004

(86) PCT No.: PCT/EP2004/014385

§ 371 (c)(1),
(2), (4) Date: Aug. 4, 2006

(87) PCT Pub. No.: WO2005/065989

PCT Pub. Date: Jul. 21, 2005

(65) Prior Publication Data

US 2007/0157751 A1 Jul. 12, 2007

(30) Foreign Application Priority Data

Jan. 9, 2004 (DE) .................... 10 2004 001 624

(51) Int. Cl.
*F16M 13/00* (2006.01)
(52) U.S. Cl. ............... 248/429; 248/419; 248/420; 248/422; 296/63; 296/65.01; 296/65.13; 296/65.14; 296/65.15

(58) Field of Classification Search ............... 248/419, 248/420, 422, 429; 296/63, 65.01, 65.13, 296/65.14, 65.15
See application file for complete search history.

(56) References Cited

U.S. PATENT DOCUMENTS

| | | | | |
|---|---|---|---|---|
| 4,309,015 A | * | 1/1982 | Muhr | 248/396 |
| 5,150,872 A | * | 9/1992 | Isomura | 248/429 |
| 5,259,257 A | * | 11/1993 | Mouri | 248/429 |
| 5,267,717 A | * | 12/1993 | Isomura | 248/430 |

(Continued)

FOREIGN PATENT DOCUMENTS

DE 43 01 241 C2 7/1994

(Continued)

*Primary Examiner*—J. Allen Shriver, II
*Assistant Examiner*—Michael McDuffie
(74) *Attorney, Agent, or Firm*—The Nath Law Group; Jerald L. Meyer; Jiaxiao Zhang

(57) ABSTRACT

The invention relates to a drive for adjusting motor vehicle seats comprising a spindle (5) fixed to a first (4) of two rails (3, 4) which are adjustable with respect to each other with the aid of holding devices (60) arranged on the end of the spindle (5). A transmission (9) actuated by a motor (2) is placed on the second rail (3), According to id invention, the holding devices (60) comprise an external bowl-shaped supporting surface (66) in which each end of the spindle (5) is fixedly mounted, respectively. Said solution is more advantageous in comparison with conventional holding devices which are embodied in the form of flexible stamped parts, in particular the inventive holding devices exhibit a high resistance in the case of crash.

10 Claims, 3 Drawing Sheets

U.S. PATENT DOCUMENTS

| | | | | |
|---|---|---|---|---|
| 5,314,158 | A * | 5/1994 | Mouri | 248/429 |
| 5,447,352 | A * | 9/1995 | Ito et al. | 296/65.14 |
| 5,470,121 | A * | 11/1995 | Ito | 296/65.14 |
| 5,516,071 | A * | 5/1996 | Miyauchi | 248/429 |
| 5,738,327 | A * | 4/1998 | Tanaka et al. | 248/419 |
| 5,769,377 | A * | 6/1998 | Gauger | 248/429 |
| 5,871,195 | A * | 2/1999 | Gauger | 248/419 |
| 6,059,345 | A * | 5/2000 | Yokota | 296/65.14 |
| 6,086,154 | A * | 7/2000 | Mathey et al. | 297/341 |
| 6,220,642 | B1 * | 4/2001 | Ito et al. | 296/65.14 |
| 6,260,922 | B1 * | 7/2001 | Frohnhaus et al. | 297/330 |
| 6,695,379 | B1 * | 2/2004 | Ishida | 296/65.14 |
| 7,051,986 | B1 * | 5/2006 | Taubmann et al. | 248/429 |
| 7,143,513 | B2 * | 12/2006 | Taubmann et al. | 29/893.1 |

FOREIGN PATENT DOCUMENTS

| | | |
|---|---|---|
| DE | 100 03 305 C1 | 6/2001 |
| EP | 1 068 093 B1 | 1/2001 |
| EP | 1068093 A1 * | 1/2001 |
| WO | WO 86/06036 | 10/1986 |

* cited by examiner

DRIVE FOR ADJUSTING MOTOR VEHICLE SEATS

The invention relates to a drive for adjusting vehicle seats, having a spindle that is attached to a first of two rails that are adjustable relative to one another, by means of a support device situated on at least one end of the spindle, and having a gear mechanism driven by a motor, which is disposed on the second rail.

Figure 1:
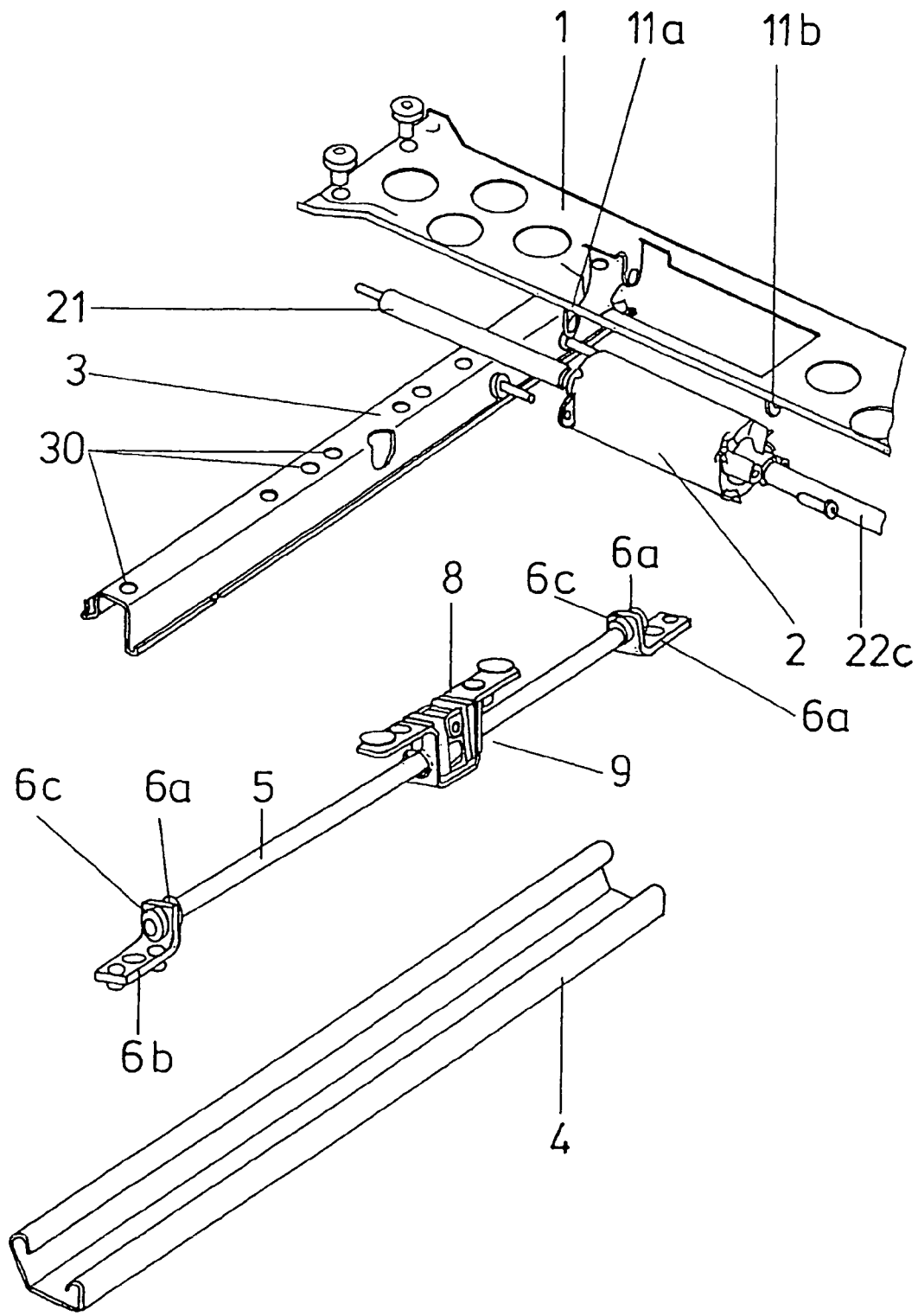

A known drive for seat adjustments is described in EP 1 068 093 B1. The drive is shown in FIG. 1 in that document and in the present document. As can be seen, a support plate 1, on which the seat of a motor vehicle is to be attached, is assigned to upper rail 3. Attachment tabs 11a, 11b for motor 2 are provided on support plate 1, 50 that the former can be firmly connected with support plate 1 and therefore firmly connected with the upper rail. Drive shafts 21, 22 are arranged on both sides of motor 2. Flexible shafts can be used for this purpose. These drive shafts 21, 22 represent the connection to gear mechanism 9, which is described in detail in EP 1 068 093 B1. This gear mechanism 9 sits in U-shaped support bracket 8 having attachment holes 8a by means of which gear mechanism 9 is attached to upper rail 3.

Upper rail 3 slides on lower rail 4 fixed in place on the vehicle floor of the motor vehicle by way of adjustment and/or bearing elements, not shown.

of Upper rail 3 and lower rail 4 are held their functional position in such a manner using their contact areas or bearing areas, respectively, that a cavity results. Threaded spindle 5 is arranged within this cavity. This threaded spindle 5 is accommodated between support devices 6a and 6b, which are firmly arranged on lower rail 4. For this purpose, support devices 6a and 6b have attachment holes 6e through which suitable screw connections or similar attachment means project and can be held on attachment holes 4a of the lower rail. Spindle 5 itself is firmly screwed onto support devices 6a and 6b by way of suitable attachment nuts 6c, 6d.

A problem in the case of the drive shown in FIG. 1 is the configuration of support devices 6a and 6b.

These support devices 6a, 6b that are shaped in an L shape are usually produced as punched and bent parts, whereby the support devices are first punched out of metal plates as strip-shaped elements and subsequently bent at a right angle. It is true that this type of punched and bent parts are relatively simple to produce and are thus inexpensive. However, a disadvantage consists in the overly low strength of these support devices. This is because such punched and bent parts are capable of absorbing only a limited amount of forces in the event of a crash. It has been shown in experiments that such punched and bent parts can only withstand relatively low forces in the event of a crash, for example, not exceeding approximately 20 kN.

This is where the present invention applies.

The invention's objective consists in further developing the known drive in such a manner that the support device(s) will be able to absorb greater forces than was the case previously in the event of a crash.

This goal is achieved by means of a drive having the characteristics as described in claim 1.

Further developments of the invention constitute the object of the dependent claims.

The invention consists essentially of configuring the support devices in such manner that the spindle's end(s) are no longer fixed in place on L-shaped punched and bent parts by means of screw connections, but rather, that this end or these ends of the spindle sit in trough-shaped support surfaces of the support devices in a fixed manner.

The fixed connection between the support devices and the ends of the spindle are achieved by means of laser welding in a preferred embodiment of the invention. For this purpose, it is practical if two weld seams that run parallel to the spindle's axis are placed in the border area of the trough-shaped support surface, which seams connect the support device with one end of the spindle. It is preferred that the weld seam's length is at least approximately 10 mm, preferably approximately 15 mm. This, of course, requires that the trough-shaped support surface in the support device is also dimensioned with a corresponding length.

With regard to an adequately great strength of the spindle, producing it from rolled round steel proved to be advantageous. To fix the ends of the spindle in place in the trough-shaped support surfaces of the support devices, the ends are lathed in such a manner, for example, that their diameter is less then the root circle of the spindle's thread. For example, the diameter can be approximately 7 mm. Because of this lathing of the spindle's ends, the spindles are fully butting against the trough-shaped support surface that is shaped in the same manner and which also has a similar rounding including an imaginary diameter that corresponds to the diameter of the spindle's ends, whereby it must be taken into consideration that the support surface's diameter must be shaped to be the same [or] slightly greater than the diameter of the spindle's ends so that they can fully rest against the trough-shaped support surface thus allowing optimal laser welding.

In a further development of the invention, the support devices are shaped in an L-shape, whereby the support devices' horizontal shank is plate-shaped and has an attachment hole. In contrast, the vertical shank consists of a solid, block-like part on top of which the aforementioned trough-shaped support surface for the spindle ends is formed. This trough-shaped support surface extends parallel to the horizontal shank of the support device.

In order to achieve great crash strength in an assembled state, the support device's horizontal shank has a width that corresponds approximately to the inner distance of the lower rail, which is shaped in a U-shape in its cross section and into which the support device is inserted. This type of width selection has proven to be advantageous in order to adequately absorb forces in the event of a crash.

The solid vertical shank of the support device that is shaped in block-type manner has a lesser width than the support device's horizontal shank. This has the advantage that the upper rail and the ball bearing can move past the horizontal shank of the support device when the seat is moved.

In a further development of the invention, the vertical shank has reinforcement bands that are formed on in one piece, on the border side, which also absorb additional forces in the event of a crash in the inner transition area towards the support devices' horizontal shank.

To increase the crash forces that are to be absorbed in the event of an impact accident of a motor vehicle, one or more projecting cams are formed at the support device's bottom side. Thus, for example, a cam that projects between the attachment hole and the front edge of the support device's horizontal shank can engage into a corresponding recesses [sic—plural] on the seat adjustment device's lower rail. A second cam can be placed on the flat support surface on the support device's bottom side in the area of the solid vertical shank that is shaped in block-shaped manner.

It is preferred that the recesses for the aforementioned cam(s) are shaped in such manner that allows a fixation of the support devices plus spindle on the lower rail. For this purpose, one must know that in the drivers provided assembly according to the invention, the U-shaped support bracket (cf.

reference symbol 8 in FIG. 1) in which the gear mechanism is seated, is first screwed onto the upper rail. The upper rail and the lower rail are subsequently pushed into one another in a suitable assembly device, whereby the assembly device's support fingers engage below the support devices. The upper rail and the lower rail are subsequently moved back and forth several times, e.g., ten to 20 times, so that the ball bearing located between the upper and lower rail can "be broken in." Finally, the assembly device's support fingers are pulled away so that they can engage there during the next push as soon as the cams run over the recesses in the lower rail.

Contrary to conventional screw or rivet connections, the present invention is thus characterized by a simplified assembly of the support devices on the lower rail. Furthermore, the support devices are releasably attached on the lower rail, which is advantageous in then event that repairs or a replacement of the drive components becomes necessary.

The aforementioned cams not only increase the crash forces that are to be absorbed in the event of an accident of the vehicle. The two cams also ensure that no rotational displacement occurs during the assembly of the lower rail on the vehicle floor. Unintentional rotation or lateral deviation of the support device and the spindle is prevented if the lower rail and the spindle pre-assembled by way of the cams is screwed tightly onto the vehicle floor. For this purpose, screws are inserted through the attachment holes of the support device and through the holes of the lower rail that were aligned for this purpose, and screwed tightly into the attachment nuts on the vehicle floor. The torque that acts during this screw-in process is counteracted by the cams that are sitting in the lower rail's recesses so that the spindle plus gear mechanism remains aligned in a precise manner in the lower rail.

The surface of the vertical shank of the support device that is shaped in a block-shaped manner, which surface faces the gear mechanism, is advantageously structured as a flat stop surface for the drive's gear mechanism. This flat stop surface is aligned orthogonally to the support device's horizontal shank.

Although the support device according to the invention can be produced in a multitude of different ways, it lends itself to produce it as a cold-extruded part that would be made from metal, and from steel, in particular. The special advantage of such cold-extruded parts lies in the fact that high crash forces can be absorbed up to 30 kN, while the part takes up little construction space.

The support device's configuration according to the invention not only permits the absorption of greater forces in the event of a crash, but is also characterized by a longer displacement path of the gear mechanism presupposing that the attachment holes for the support devices are as provided by prior art. This lengthened displacement path is possible because the gear mechanism can move directly up to the support device's stop surface and the support device itself has a shorter build than the support devices according to prior art.

Figure 2:
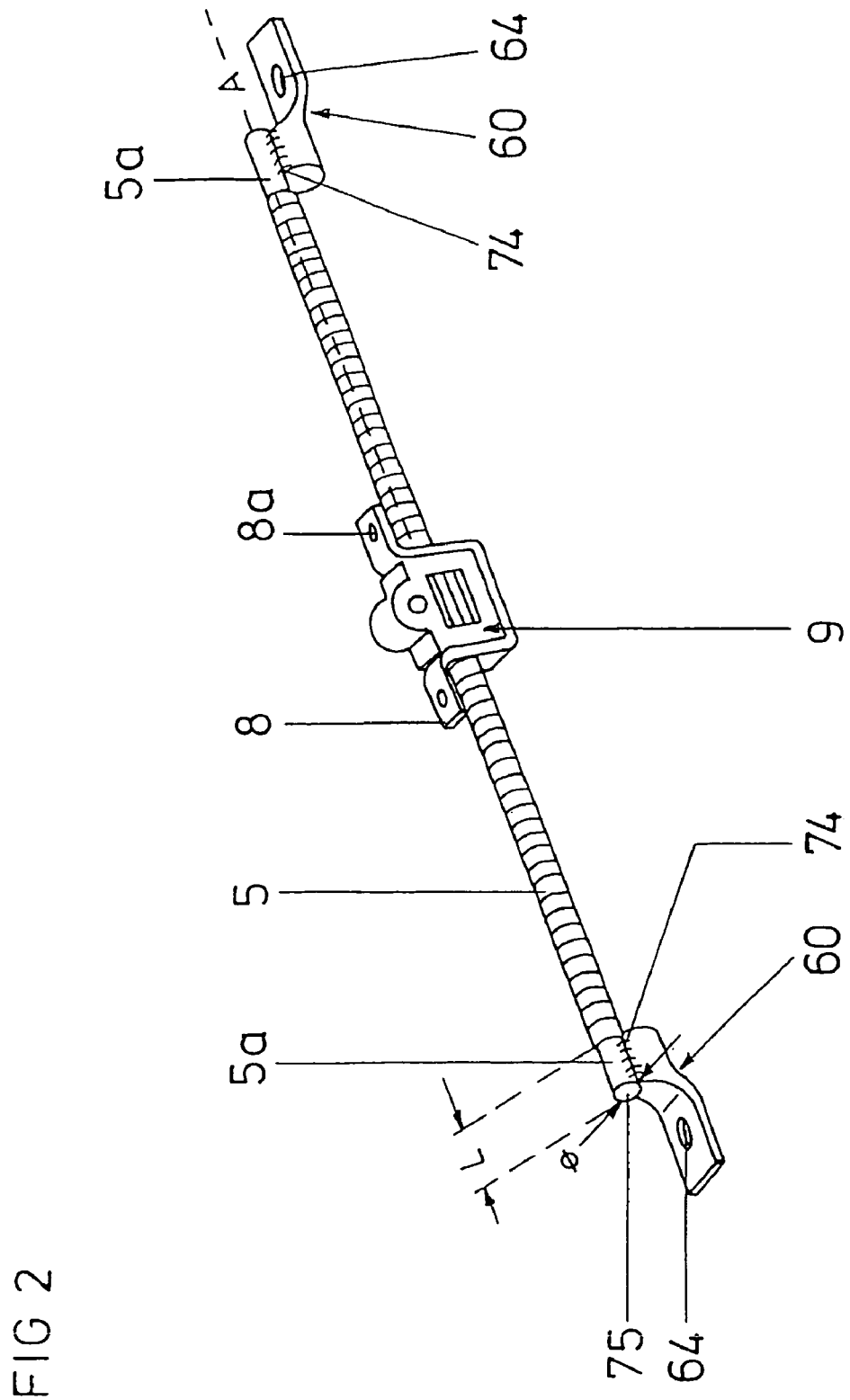

The drive according to the invention will be explained in greater detail in the following where an exemplary embodiment will be used in connection with additional figures. They show the following:

FIG. 1 the drive as already explained according to the known state of the art, having a spindle fixed in place at its ends by means of support devices on which is seated a gear mechanism that can be moved longitudinally, FIG. 2 a gear mechanism that is seated on a spindle—similar to FIG. 1—but that includes support devices, which are shaped according to an exemplary embodiment of the invention, FIGS. 3-6 the support devices shown in FIG. 2 with various views.

In the following figures the same reference symbols refer to the same parts having the same significance unless indicated otherwise.

In FIG. 2, similar to FIG. 1, spindle 5 and gear mechanism 9 that can be moved on spindle 5 along spindle axis A is shown again. Gear mechanism 9 is fixed in place in U-shaped support device 8 that is already known, which device can be screwed in place on upper rail 3 (cf. FIG. 1) of a vehicle seat by way of attachment holes 8a.

In contrast to the representation of FIG. 1, spindle 5 is rigidly connected at its ends 5a by means of specially shaped support devices 60, which will be explained in greater detail in connection with FIGS. 3-6.

Figure 3:
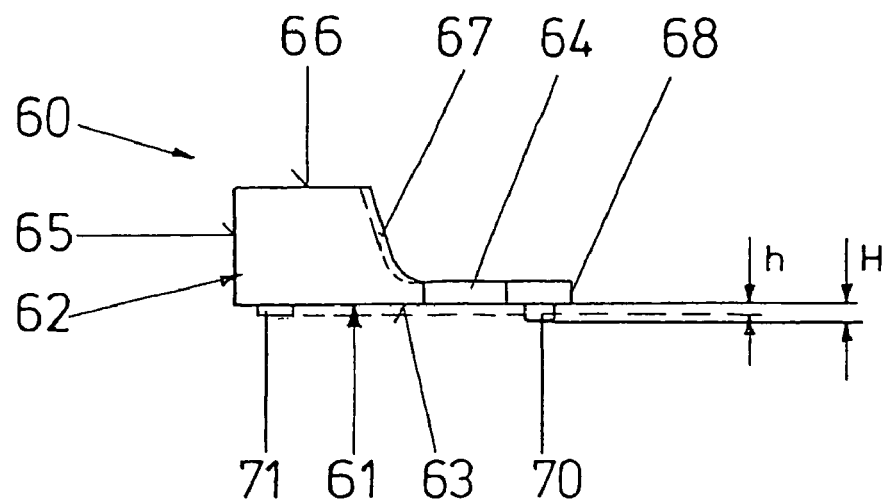

Support devices 60 are shaped in an L-shape as shown by the side view of FIG. 3; they have plate-shaped horizontal shank 61 as well as vertical shank 62, which is shaped as a solid, block-like part. Attachment hole 64 is incorporated in plate-shaped horizontal shank 61. This attachment hole 64 serves to screw support devices 60 tightly onto the vehicle floor by way of lower rail 4 (cf. FIG. 1, in this regard) by means of suitable attachment elements. E.g. screw connections or rivet connections will be suitable for this purpose.

Horizontal shank 61 of support device 60 has flat support surface 63 on its lower side, facing away from vertical shank 62, which is intended to be seated onto lower rail 4. Two cams 70, 71 project out from this support surface 63. First cam 70, which is located between attachment hole 64 and front edge 68 of support device 60, engages into a corresponding recess in lower rail 4 of the seat frame. Second cam 71 projects out of support surface 63 below vertical, block-like shank 62. This cam 71 also projects into a corresponding recess in lower rail 4 of the seat frame. Cam 70 has a height H that is greater than height h of the cam 71. Diameter x of cam 70 is less than diameter X of second cam 71. Diameters x and X of two cams 70, 71 are clearly less than the diameter of attachment hole 64. Two cams 70, 71 increase the absorption of crash forces in the assembled state of support device 60 of lower rail 4 (cf. FIG. 1). In addition, two cams 70 and 71 serve to prevent rotation during the assembly of lower rail 4 on the vehicle floor.

Figure 4:
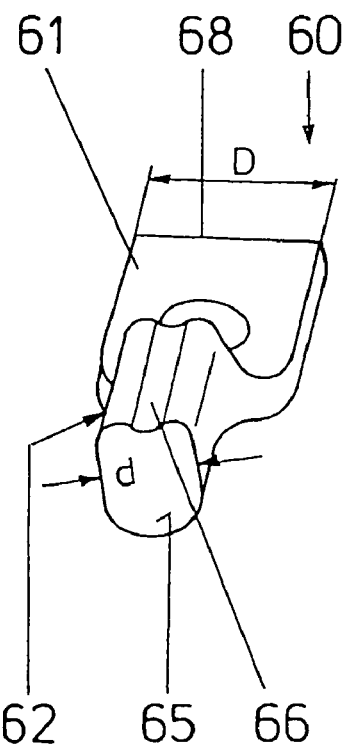
Figure 5:
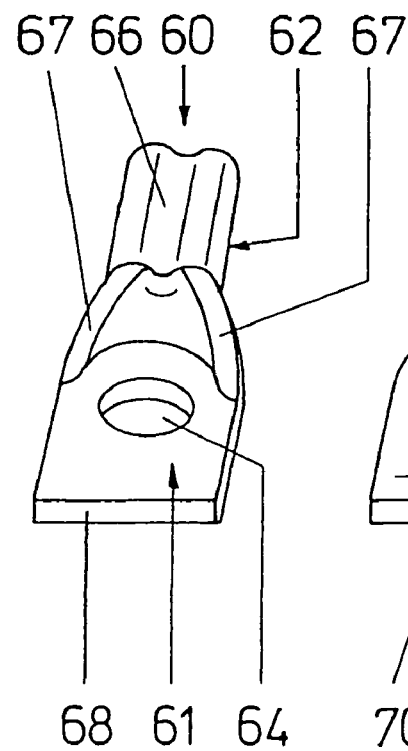
Figure 6:
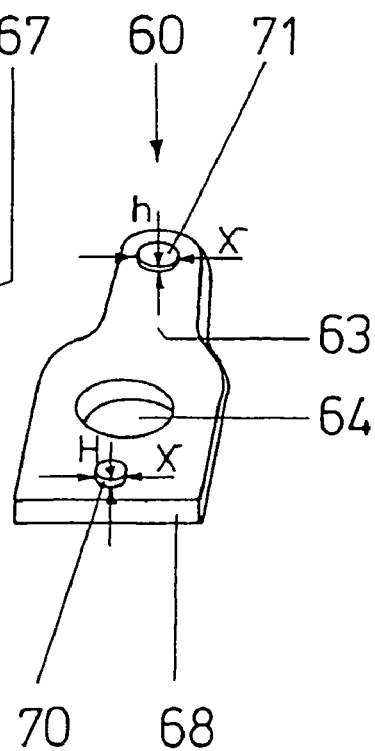

As is particularly evident from the perspective representations of FIG. 4 and FIG. 5 of support device 60, horizontal shank 61 of the support device has clearly a greater width D than solid, block-like, vertical shank 62 of support device 60. The width of vertical shank 62 is indicated as d. The width D of horizontal shank 61 is approximately as wide as the inner distance ID of lower rail 4 (cf. FIG. 1).

Groove-like or trough-like depression 66, which serves as a support surface for one end 5a of spindle 5 (cf. FIG. 2), in each instance, runs on the top of vertical shank 62.

The ends of 5a are lathed off for example to attach spindle 5 that consists of rolled round steel; in other words ends 5a no longer have a thread the diameter of ends 5a is e.g. about 6 to 7 mm while the outside diameter of the thread can amount to 9 mm. The radius of trough-like depression 66 is shaped to match this, preferably to be slightly larger, so that ends 5a of spindle 5 can lie in trough-like depression 66 over their full area or in line shape. To attach ends 5a in this trough-like depression 66, they are attached by means of a weld seam in each instance at the points that are accessible on the left and the right, preferably by means of laser welding. The length of the weld seams should amount to at least approximately 10 mm, preferably about 15 mm.

In order to increase the absorption of crash forces during tensile stress and pressure stress for support device 60, the transition from horizontal shank 61 to vertical shank 62 is not shaped in a precise 90° angle but rather in a more obtuse angle to it, as is particularly evident in FIG. 3. Furthermore, reinforcement bands 67 are formed on in one piece at the outer edges of the transition, which reinforce the border area of the slanted transition between vertical shank 62 and horizontal shank 61 under pressure stress or tensile stress.

Finally, support device 60 has flat stop surface 65 that connects lower support surface 63 and upper, trough-like support surface 66 with one another. This flat stop surface 65 can serve as a stop for gear mechanism 9 in its end position.

In connection with the embodiment of the invention, it was always stated that spindle's both ends are held in the support devices as developed according to the invention. However, it also lies within the scope of the invention that only one end of the spindle is held by such a support device, and the other end is held in a conventional manner by a different support device.

Although it was mentioned in connection with the exemplary embodiment shown that gear mechanism 9 is arranged on a spindle in a movable manner, the present invention also includes replacing the spindle with a rack. One must only ensure that the ends of such a rack—similar to the representation in FIG. 2—have a lathed-off end segment that fits into the trough-shaped recess of support surface 66 of vertical shank 62 of support device 60 with its diameter, and can be attached securely to the shank there, e.g. by means of laser welding.

REFERENCE SYMBOL LIST

1 Support plate
2 Drive motor
3 Upper rail
4 Lower rail
4a Attachment hole
5 Spindle
5a Area with reduced diameter
6 Support device
6a Support device
6b Support device
6c Attachment nut
6d Attachment nut
6e Attachment holes
8 Support device
8a Attachment hole
9 Gear mechanism
11a, 11b Attachment tabs
21 Drive shaft
22 Drive shaft
30 Attachment holes
60 Support device
61 Horizontal shank
62 Vertical shank
63 Support surface
64 Attachment hole
65 Stop surface
66 Support surface
67 Reinforcement band
68 Edge
70 Cam
71 Cam
74 Weld seam
75 Weld seam
A Spindle axis
D Width of 61
d Width of 62
H Height of 70
ID Inner distance of 4
h Height of 71
L Length of 5a
Ø Diameter of 5a
x Diameter of 70
X Diameter of 71

The invention claimed is:

1. Drive for a seat adjusting device, in particular for motor vehicles, with spindle (5) which is affixed to a first rail (4) of two rails (3, 4) that are adjustable relative to one another, by means of at least one support (60) that is located on the end of the spindle (5), and with a gear mechanism (9) which is driven by a motor (2) and which is arranged on the second rail (3), characterized in that the at least one support (60) has a trough-shaped, outer bearing surface (66) on a solid, block-like limb (61), in which bearing surface one end of the spindle (5) rests in a stationary manner, the at least one support consisting of a cold-extruded part made from metal.

2. Drive according to claim 1, characterized in that two such supports (60) are provided, of which in each case one support (60) serves to support one of two ends (5a) of the spindle (5).

3. Drive according to claim 1, characterized in that the spindle (5) is attached to the trough-shaped bearing surface (66) by means of laser welding.

4. Drive according to claim 3, characterized in that the spindle (5) is affixed to the edge area of the trough-shaped bearing surface (66) by means of two weld seams (74, 75) running parallel to the spindle axis (A).

5. Drive according to claim 4, characterized in that each of the weld seams (74, 75) is at least approximately 10 mm long.

6. Drive according to claim 1, characterized in that the spindle (5) is manufactured from rolled round steel.

7. Drive according to claim 1, characterized in that the ends (5a) of the spindle (5) are lathe-turned and have a diameter (Ø) that is smaller than the root diameter of the toothed work of the spindle (5).

8. Drive according to claim 7, characterized in that the ends of the spindle (5) have a diameter of approximately 7 mm.

9. Drive according to claim 1, characterized in that the trough-shaped bearing surface (63) runs parallel to the horizontal limb (61).

10. Drive according to claim 9, characterized in that the horizontal limb (61) has an attachment hole (64) for fastening to the vehicle floor.

* * * * *